(12) United States Patent
Butler et al.

(10) Patent No.: US 8,643,315 B2
(45) Date of Patent: *Feb. 4, 2014

(54) UNIVERSAL APPARATUS AND METHOD FOR CONFIGURABLY CONTROLLING A HEATING OR COOLING SYSTEM

(75) Inventors: William P. Butler, St. Louis, MO (US);
Edward B. Evans, St. Louis, MO (US);
Thomas B. Lorenz, St. Louis, MO (US);
Carl J. Mueller, St. Louis, MO (US);
Steven L. Carey, St. Louis, MO (US);
G. Scott Vogel, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/912,245

(22) Filed: Oct. 26, 2010

(65) Prior Publication Data

US 2011/0066289 A1 Mar. 17, 2011

Related U.S. Application Data

(63) Continuation of application No. 12/107,755, filed on Apr. 22, 2008, now Pat. No. 7,821,218.

(51) Int. Cl.
*H02K 7/14* (2006.01)
(52) U.S. Cl.
USPC .............................................. 318/3; 318/600
(58) Field of Classification Search
USPC ................... 318/569, 600, 461, 3, 9
See application file for complete search history.

(56) References Cited

U.S. PATENT DOCUMENTS

| | | | |
|---|---|---|---|
| 4,976,459 A * | 12/1990 | Lynch | 236/11 |
| 5,058,388 A | 10/1991 | Shaw et al. | 62/93 |
| 5,265,436 A | 11/1993 | Murata et al. | 62/175 |
| 5,382,410 A * | 1/1995 | Peltier | 422/121 |
| 5,410,230 A | 4/1995 | Bessler et al. | 318/471 |
| 5,544,809 A * | 8/1996 | Keating et al. | 236/44 C |
| 5,592,058 A | 1/1997 | Archer et al. | |
| 5,675,830 A | 10/1997 | Satula | 710/9 |
| 5,706,190 A | 1/1998 | Russ et al. | 700/9 |
| 5,805,768 A * | 9/1998 | Schwartz et al. | 392/390 |
| 5,875,965 A | 3/1999 | Lee | 236/44 C |
| 5,927,398 A | 7/1999 | Maciulewicz | 165/209 |
| 6,353,775 B1 | 3/2002 | Nichols | 700/276 |

(Continued)

OTHER PUBLICATIONS

"ClimateTalk Standard" Copyright; May 23, 2002; 37 pgs.

*Primary Examiner* — Rina Duda
(74) *Attorney, Agent, or Firm* — Harness, Dickey & Pierce, P.L.C.

(57) ABSTRACT

A system for controlling the operation of a heating or cooling system includes a system controller, a memory in which system parameter information relating to the heating or cooling system is stored, and a communication device through which the system controller is configured to transmit and receive signals to/from at least one component controller. The system controller is configured to receive via the communication device a data signal from the at least one component controller that includes information relating to operational parameters for at least one system component installed in the heating and cooling system. The system controller is configured to store in the memory the received operational parameters corresponding to the at least one system component. The stored operational parameters may be retrievable for communication to a replacement component controller in the event that the at least one component controller is replaced.

36 Claims, 4 Drawing Sheets

(56) References Cited

U.S. PATENT DOCUMENTS

| | | | |
|---|---|---|---|
| 6,456,023 B1* | 9/2002 | Becerra et al. | 318/400.26 |
| 6,467,696 B2 | 10/2002 | Riley et al. | 236/49.3 |
| 6,662,118 B2* | 12/2003 | Carle et al. | 702/33 |
| 6,671,633 B2 | 12/2003 | Kramb et al. | |
| 6,701,258 B2* | 3/2004 | Kramb et al. | 702/33 |
| 6,704,668 B2* | 3/2004 | Bibelhausen et al. | 702/45 |
| 6,711,527 B2* | 3/2004 | Bibelhausen et al. | 702/188 |
| 6,714,880 B2* | 3/2004 | Carle et al. | 702/56 |
| 6,766,651 B2 | 7/2004 | Dillenback | 62/180 |
| 6,768,949 B2* | 7/2004 | Shupe et al. | 702/33 |
| 6,776,348 B2* | 8/2004 | Liu et al. | 235/492 |
| 6,912,484 B2* | 6/2005 | Bibelhausen et al. | 702/188 |
| 6,920,527 B2* | 7/2005 | Cloutier et al. | 711/115 |
| 7,296,426 B2 | 11/2007 | Butler et al. | |
| 7,479,876 B2* | 1/2009 | Carle et al. | 340/539.17 |
| 7,535,186 B2* | 5/2009 | Beifus | 318/34 |
| 7,593,784 B2* | 9/2009 | Carle et al. | 700/175 |
| 2003/0097482 A1 | 5/2003 | DeHart et al. | 709/253 |
| 2004/0111500 A1 | 6/2004 | Rayburn | 709/222 |
| 2004/0128613 A1* | 7/2004 | Sinisi | 715/500 |
| 2004/0219875 A1* | 11/2004 | Mills | 454/256 |
| 2007/0152613 A1* | 7/2007 | Mullin | 318/432 |

* cited by examiner

UNIVERSAL APPARATUS AND METHOD FOR CONFIGURABLY CONTROLLING A HEATING OR COOLING SYSTEM

CROSS-REFERENCE TO RELATED APPLICATIONS

This application is a continuation of U.S. patent application Ser. No. 12/107,755 filed on Apr. 22, 2002, now U.S. Pat. No. 7,821,218 issued Oct. 26, 2010. The entire disclosure of the above application is incorporated herein by reference.

FIELD

The present disclosure relates to heating and/or cooling systems, and more particularly to system controllers for controlling the operation of heating and/or cooling systems.

BACKGROUND

The statements in this section merely provide background information related to the present disclosure and may not constitute prior art.

Manufacturers of heating and/or cooling systems typically design a number of different units to accommodate a variety of building sizes and needs. For example, a higher capacity multi-stage heating system may be required for a newly expanded building with an adequate cooling system, while an older building with a hydronic heating system may only require the installation of a replacement cooling system. Likewise, a newly constructed building may include an energy efficient heating and cooling system capable of operating at different stages or capacities, to operate at the required level of heating or cooling in an energy efficient manner. Accordingly, the various heating and cooling systems offered by manufacturers will each require a controller configured for the particular system.

SUMMARY

The present application discloses various embodiments of a universal system controller for controlling the operation of a heating and/or a cooling system. In one embodiment, a system controller is provided that includes a communication means for transmitting and receiving information from an installed blower motor controller, and a removable memory device connected to the system controller. The removable memory device includes system parameter information stored thereon that relates to the particular heating or cooling system, where the system parameter information includes at least motor related parameters relating to the operation of one or more types of blower motors. The system controller further includes a processor configured to receive via the communication means the communication of identifying information from the blower motor controller that identifies the type of blower motor installed in the system. The processor is configured to retrieve motor related parameters corresponding to the specific identified blower motor controller from the memory device, and to send said corresponding motor related parameters to the blower motor controller.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
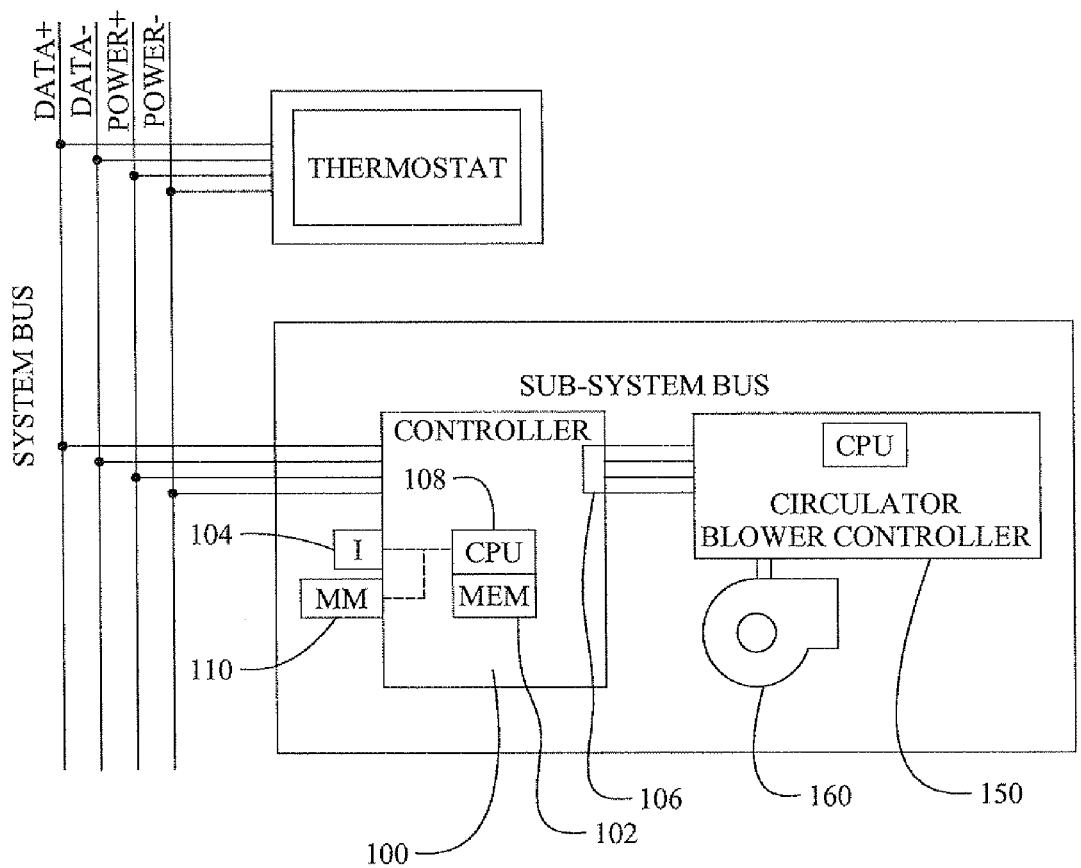
FIG. 1 is a schematic illustration of a heating system that includes a system controller according to the principles of the present disclosure.

The following description is merely exemplary in nature and is not intended to limit the present disclosure, application, or uses. It should be understood that throughout the drawings, corresponding reference numerals indicate like or corresponding parts and features.

The present application describes various embodiments of a controller for controlling a number of different environmental control systems that include a blower motor and a blower motor controller. Some environmental control systems may only include a heat-only system, which may be operated independent from a separate cooling system. In this example, the heating system would require blower operation at a specific airflow or cubic feet per minute (CFM) for a heat and fan mode of operation. Other systems may include heating and cooling components and require blower operation at specific airflows/CFM levels for different capacity levels for a heat, cool and fan mode of operation. Either of the above systems could be sized to operate at different maximum capacities, and could have a different size blower drum or wheel. The system could also utilize different motors of various horsepower levels, for driving the blower to achieve a desired airflow (or CFM). Accordingly, achieving a desired CFM for a particular heating and/or cooling system would require a specific motor installed in the system to operate at a select speed (either clockwise or counter-clockwise as required) to drive the particular blower drum to produce the desired CFM. It should be understood that the above description of various heating and/or cooling systems are for illustrative in nature, and serve the purpose of demonstrating that heating and cooling units may include different blower designs sizes and capacities, which are operated at different levels depending on the type of system.

For the above reasons, systems typically employ a blower motor controller that utilizes coefficients and parameters specific to the particular blower and/or system, which are used in determining a speed for which the installed motor will achieve the requested airflow or CFM. Manufacturers may also design different capacity levels for a heating or cooling system. This may require each particular system type or capacity level to be controlled at different airflow CFM's. Accordingly, the system controller for each particular size and type of system must be configured for controlling and/or specifying the various blower CFM levels required for the particular system, and the various coefficients and parameters specific to the particular blower/blower motor installed in the system.

Thus, each particular heating and/or cooling system requires a particular controller that is specific to that particular size and type of system. It should be understood that while a motor may be installed and configured to operate in various different blowers/systems, the present application discloses various embodiments of a universal controller that may be installed and configured to control and operate a variety of different heating and/or cooling systems.

In the various embodiments disclosed in the present application, a universal configurable controller is provided, which permits manufacturers of heating and/or cooling systems to configure a "blank" controller for each particular size and type of system. In the event that the universal controller (once installed and configured) becomes damaged, defective, or requires replacement for any reason, the universal controller is configured such that it may be readily replaced by a "blank" universal controller, as will be described below.

The various embodiments of a controller include a communication means, such as a Universal Asynchronous Serial Port (UART), a 4-wire connection, or other forms of communication lines, through which information is communicated between the controller and a blower motor controller associated with the particular installed blower motor. The various embodiments of a controller further provide for input of information to the controller, and a memory associated with the controller. The various controller embodiments further include a processor that, upon installation and power up of the controller, is configured to receive the input of information that includes parameters associated with the particular system and its installed blower motor, which information is stored in the memory associated with the controller. The processor is further configured to receive information from the blower motor controller identifying the manufacturer identification and/or horsepower of the installed motor. From this identifying information, the processor is configured to retrieve from memory the motor related parameters that are specific to the identified blower motor, and to send the specific parameters to the blower motor controller. The motor related parameters are sent to the blower motor controller, to thereby provide the specific operating parameters for the particular system and the identified blower motor to the blower motor controller, which subsequently uses the parameters in controlling the operation of the blower motor.

Accordingly, one or more embodiments of a universal system controller are disclosed, which comprise a communication means for transmitting and receiving information from an installed blower motor controller, and a removable memory device connected to the system controller. The removable memory device includes system parameter information stored thereon that relates to the particular heating or cooling system, where the system parameter information includes at least motor related parameters relating to the operation of one or more types of blower motors. The system controller further includes a processor configured to receive via the communication means the communication of identifying information from the blower motor controller that identifies the type of blower motor installed in the system. The processor is configured to retrieve motor related parameters corresponding to the specific identified blower motor controller from the memory device, and to send said corresponding motor related parameters to the blower motor controller. The system controller thereby provides the specific operating parameters corresponding to the identified blower motor to the blower motor controller, for use in controlling operation of the blower motor.

According to one aspect of the present disclosure, one embodiment of a universal configurable controller 100 is shown in FIG. 1. The controller 100 includes a memory 102 associated with the controller 100 that is initially "blank", or absent any parameters specific to any particular system or blower motor. The memory 102 associated with the controller 100 is preferably a programmable non-volatile memory device, having an electrically erasable programmable read only memory (EEPROM). The memory 102 could be external to the controller's processor, or it could be embodied as an on-board memory associated with a processor.

The controller 100 may include an input interface 104 that allows manufacturers who purchase the controller 100 to input information including parameters specific to a particular heating and/or cooling system that the manufacturer is producing. The input interface 104 permits the input of information that includes parameters specific to a number of various blower motors that may be installed, including the particular blower motor installed in the particular system. This permits manufacturers to configure the "blank" controller 100 for a particular size and type of system, which includes a particular blower operated by any one of a number of specific motor types. The memory 102 associated with the controller 100 is preferably utilized to store this input information.

The first embodiment of a controller 100 includes a communication means 106, such as a Universal Asynchronous Serial Port (UART) 106 that provides a predetermined baud rate serial bit stream signal. The communication means may alternatively comprise a 4-wire BUS connection, or any other forms of connection for suitably permitting communication of signal information. The communication means 106 preferably communicates a signal that includes data or information provided by a data port of a processor or microprocessor of the controller 100. The communication means 106 is connected or configured to provide for communication of information between the controller 100 and a blower motor controller 150 associated with a particular installed blower motor 160.

The first embodiment of a controller 100 further includes a processor 108, which can be a microprocessor, a microcontroller, a digital signal processor (DSP) or any other suitable processing device. Upon application of electrical power to the controller 100, the processor 108 is configured to receive via the input interface 104 an input of information that includes parameters associated with a variety of blower motors 160 that may be installed for the particular system. This information is preferably input by a manufacturer of heating or cooling systems, and may include various parameters associated with each type of particular motor that the manufacturer has selected or identified as a motor that may be installed for the particular size and type of system. The specific information is preferably input via the input interface 104 to the controller 100 by the manufacturer at the time of manufacture of the particular system, and is stored in the memory 102 associated with the controller 100.

The processor 108 is further configured to receive information from the blower motor controller 150 via the communication means 106, which information identifies the manufacturer identification and/or horsepower of the blower motor 160 that is actually installed in the heating/cooling system of the manufacturer. From this identifying information, the processor 108 is configured to retrieve from memory 102 motor related parameters that are specific to the identified blower motor 160, and to send the specific parameters to the blower motor controller 150.

Once the controller 100 is selected or designated for a particular heating and/or cooling system, and the processor 108 preferably receives data or information that is input by the manufacturer via the interface device 104. The system controller 100 would then be configured by the manufacturer for the particular heating or cooling system. The processor 108 stores the specific values and parameters into the memory 102, such that the information and/or parameters relating to the particular blower motor that is installed can be retrieved and used for controlling operation of the identified blower motor. The processor 108 can then send the appropriate stored configuration variables or values to the blower motor controller 150 via the communication means 106.

In view of the above, the controller 100 is thereby configured to provide the specific operating parameters corresponding to the particular system and the identified blower motor 160 to the blower motor controller 150, for subsequent use in controlling the operation of the blower motor 160. The controller 100 may further include a separate memory module 110 that is connected to the controller 100 via a Universal Serial Bus (USB) interface, or other comparable connection means. The processor 108 is further configured to communicate the information input by the manufacturer to the memory module 110, such that the system specific information is stored on the memory module. In the event that the controller 100 becomes damaged, defective, or requires replacement for any reason, a replacement controller that is "blank" may be used to replace the originally installed controller, where the memory module 110 is simply removed from the original controller and reconnected to the replacement controller. Accordingly, a universal "blank" configurable controller is provided that permits manufacturers of heating and/or cooling systems to configure the "blank" controller for a particular size and type of system, while also permitting the replacement of the installed configured controller with a "blank" replacement controller.

When a "blank" system controller is first supplied to a manufacturer or OEM, the OEM programs it for the specific unit it will be installed in. After the system controller is programmed or configured by the manufacturer, a "blank" separate memory module is installed via the USB interface on the controller. When the controller detects the installation of the blank memory module, it copies the OEM information that was stored in the controller's on-board memory 102 to the separate memory module 110. The controller 100 is configured to synchronize the onboard memory with the separate memory module 110.

As stated above, the controller 100 is configured to receive a plurality of input signals. The system controller 100 includes an input interface 104 that is configured to receive from the system manufacturer the input of a number of parameters that may be used to control the operation of the heating or cooling system or the blower motor controller. The manufacturer preferably connects a device to the input interface 104 that provides motor related data in the input signals into the controller 100. The information preferably includes motor related parameters corresponding to a number of different blower motors or blower motor controllers.

As stated above, the system controller 100 may receive input information including various coefficients and parameters, and communicate information to the blower motor controller that includes one or more coefficients and parameters. For example, the processor 108 may communicate a command signal to the motor controller that identifies the Message type, packet number and length of information, as well as specific information such as that shown in the table below.

TABLE 1

| Destination or profile | Code | Description |
|---|---|---|
| OEM ID | 12 | White-Rodgers |
| Manufacturer ID | 9 | OEM customer |
| Node/Control type | 3 | C2 |
| Number of fields | 4 | data to be extracted |
| System configuration ID | 2 | |
| Indoor blower run mode | 2 | Cubic feet per minute mode |
| Indoor blower max speed | 1400 | Max Cubic feet per minute |
| Blower cutback slope | 16 | |
| Blower cutback speed | 255 | |
| Heat on delay | 45 | seconds |
| Cool air flow multiplier (0) | 100 | Percent of maximum |
| Cool air flow multiplier (1) | 90 | Percent of maximum |
| Cool air flow multiplier (2) | 80 | Percent of maximum |
| Heat air flow multiplier (0) | 100 | Percent of maximum |
| Heat air flow multiplier (1) | 90 | Percent of maximum |
| Heat air flow multiplier (2) | 80 | Percent of maximum |

The system controller 100 may be configured to communicate a signal to the motor controller that includes one of the above parameters, which signal is transmitted according to a specific communication protocol. One such protocol is the ClimateTalk protocol developed by Emerson Electric Co., which is disclosed in U.S. application Ser. No. 12/107,747, filed Apr. 22, 2008, now U.S. Pat. No. 7,774,102 issued Aug. 10, 2010, which is incorporated herein by reference. This protocol specifies how information is identified and recognized by the system controller, such as the parameters associated with one or more specific motor types that may be input to the system controller. The table below illustrates a portion of this protocol relating to a blower motor, as an example.

TABLE 2

Section 9.1.3 Air Handler Configuration Data

| Packet | DBId tag | byte | Bit description | size | Raw range | EU range | Status | Notes |
|---|---|---|---|---|---|---|---|---|
| 0 | 1 | 1 | 7-4 No of Fan speed | 4 bits | | 0-4 | present | Value = # Stage Relays-15 = Variable |
| | | | 3-0 Spares | 4 bits | | 0-4 | present | |
| | | 2 | 7-4 No of heat stage | 4 bits | | 0-4 | present | Value = # Stage Relays-15 = Variable |
| | | | 3-0 Spares | 4 bits | | 0-4 | present | |
| | | 3 | 7-2 Spares | 6 bits | | | present | 00 = 24VAC 01 = Serial |
| | | | 1-0 HVAC Operation | 2 bits | | | present | 10 = combo 11 = TBD |
| | | 4 | 7-0 Air handler size/capacity | 1 byte | | | present | |
| | | 5 | 7-0 Motor Size, HP | 1 byte | | | present | motor talk standard |

TABLE 2-continued

Section 9.1.3 Air Handler Configuration Data

| Packet | DBId tag | byte | Bit description | size | Raw range | EU range | Status | Notes |
|---|---|---|---|---|---|---|---|---|
| | | 6 | 7-0 Maximum Airflow | 1 Byte | | ÷10 | present | CFM Units |
| | | 7 | 7-0 CFM Per Ton | 4 bits | | 0-5 | present | User-menu configured |
| | | 8 | 7-4 Select tonnage (manual) | 4 bits | | whole (0-9) | present | |
| | | | 3-0 | 4 bits | | tenths (0-9) | present | |
| | | 9 | 7-0 HEAT CFM | 1 byte | | ÷10 | present | |

Each of the parameters that are required by the motor controller may be communicated between the system controller and the motor controller in accordance with the above protocol, and may be transmitted by a particular message packet structure, such as that described in section 5.5 of the ClimateTalk protocol disclosed in application Ser. No. 12/107,747, filed Apr., 22, 2008, now U.S. Pat. No. 7,774,102 issued Aug. 10, 2010. Such a transmission protocol could be used to transmit a signal to the motor controller indicating the requested mode of operation, such as a CFM mode, as indicated in the signal below. The Data Payload specifies a Mode of 0 for speed mode, 1 for Torque mode, and 2 for Airflow mode.

a number of different heating and/or cooling systems requiring up to a ½ horsepower blower motor, where the universal configurable controller is configured to include the parameters that are specific to the particular motor. This is in contrast to, for example, using multiple different HVAC system controllers for each different ½ horsepower blower motor, where each controller is programmed for a different type of HVAC system. Accordingly, a generic configurable system controller may be used in a number of different HVAC systems having different blower motor controllers, by configuring the controller with the motor related parameters specific to the particular blower motor controller that is installed.

TABLE 3

Example Message Packet structure

| Network Routing | Function | | Messages | | | | | CRC | |
|---|---|---|---|---|---|---|---|---|---|
| Byte 0 | Byte 1 | Byte 2 | Byte 3 | Byte 4 | Byte 5 | Byte 6 | Byte 7 | Byte 8 | Byte 9 |
| SCT address | Source Node Type | Message Type | Packet Number | Payload Length | Data Payload | | | Checksum | |
| 10 | Air handler(3) | 3 | 0 | 3 | 2 | 109 | Mode | LB | HB |

Similarly, the above structure could also be used to communicate a maximum CFM setting, and other parameters required by the motor controller. Accordingly, the system controller 100 may be configured to request the operation of the blower motor at a particular airflow in terms of cubic feet per minute (CFM), by communicating command signals to the blower motor controller, where the command signals include embedded therein the requested CFM and parameter information that is specific to the identified blower motor. The blower motor controller would utilize the above mode in determining the speed for establishing blower motor operation at the requested CFM.

As noted above, the number of terms and values employed in the configuration variables, such as the values of the predetermined coefficients, are typically determined based on the particular HVAC system in which the interface device 104 will be used. In this manner, the controller 100 can be configured for one or more particular heating or cooling systems via the information stored in the memory 102. In many cases, this will eliminate any need to store parameter data in the blower motor controller. As a result, a universal "blank" system controller can be used with a wide variety of blower motors in a number of different heating and/or cooling systems. For example, a particular ½ horsepower blower motor, with the appropriate motor related parameters, can be used in When the system controller 100 is configured by the manufacturer for a specific HVAC unit it will be installed in, the HVAC unit and system controller may be shipped to an installation site, and installed at the site. An HVAC contractor may at such time change some of the parameters of the system at the time of installation, to "tweak" the parameters by adjusting the trim, CFM, ramp rate, heat delay, or other settings to accommodate the actual installation requirements. As these values are entered, the system controller 100 saves the information to the memory 102, and also the separate memory module 110. In this manner, all information after installation is in effect duplicated in both memory locations.

If the system controller fails, a "blank" or generic replacement controller may be installed in its place. The separate memory module may be removed from the failed controller and may be connected via the USB interface onto the replacement controller. The replacement controller then synchronizes its memory with the memory module, but in this instance it copies all system and site specific information from the separate memory module to the on-board memory 102 of the replacement controller 100.

Figure 2:
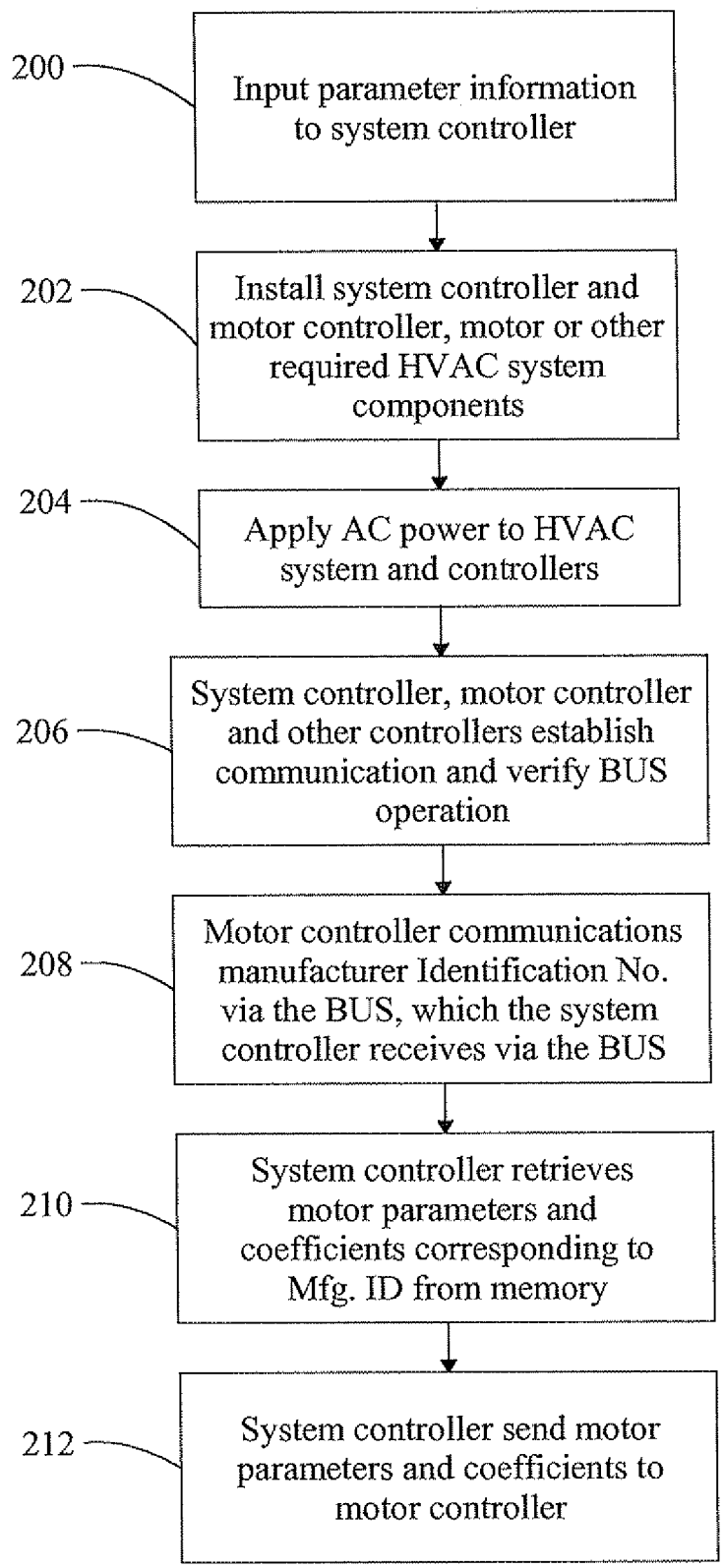
FIG. 2 is a flow chart describing one embodiment of a method for configuring and controlling the operation of a system controller for a heating or cooling system.

Referring to FIG. 2, a method for configuring a system controller for a heating or cooling system is shown. The input signals received at step 200 may be any type of signals useful in determining an appropriate blower motor and/or air flow configuration for the HVAC system. In some embodiments, these input signals include both configuration input signals and motor operating parameter inputs.

The configuration input signals are signals relating to configuration settings typically made in the field by an operator during installation of the HVAC system. These settings may be input at the time of manufacture or the time of installation. For example, the value of a particular configuration input signal may indicate the type or size of a particular component employed in the HVAC system, such as the tonnage of an outdoor compressor unit. In contrast, the motor operating input signals are signals that change during normal operation of the HVAC system. For example, the value of a particular operating input signal may represent a call for heat or cool operation. The operating input signals are typically provided by a system controller, and may include operating signals received by the system controller from a thermostat. The controller stores the information into a memory associated with the controller 100.

After installation and power-up in steps 202, 204, the controller 100 is configured to establish communication at step 206. The controller then receives the communication of information identifying the motor manufacturer or type of blower motor at step 208. Based on this identifying information, the controller 100 is configured to communicate at step 212 those parameters that correspond to the specific installed blower motor 160 to the motor controller 150. It should be understood that the controller 100 may request operation of the blower motor controller 150 to establish a particular CFM of airflow, by communicating a command signal that may have embedded therein the input information of a coefficient or operating parameter, which is used by the motor controller 150 in determining a speed for the blower motor. The controller 100 may communicate one or more command signals, each having embedded therein information that is specific to the particular blower motor that is installed, whereupon receiving each of the required parameters or inputs the motor controller 150 is configured to operate the motor to achieve the desired CFM. Configuration input signals may also be provided to the system controller, particularly where the system controller includes switches or other input means for a technician to make configuration settings in the field. As will be apparent to those skilled in the art, a number of configuration input signals and/or operating signal inputs employed in any given system or application.

Figure 3:
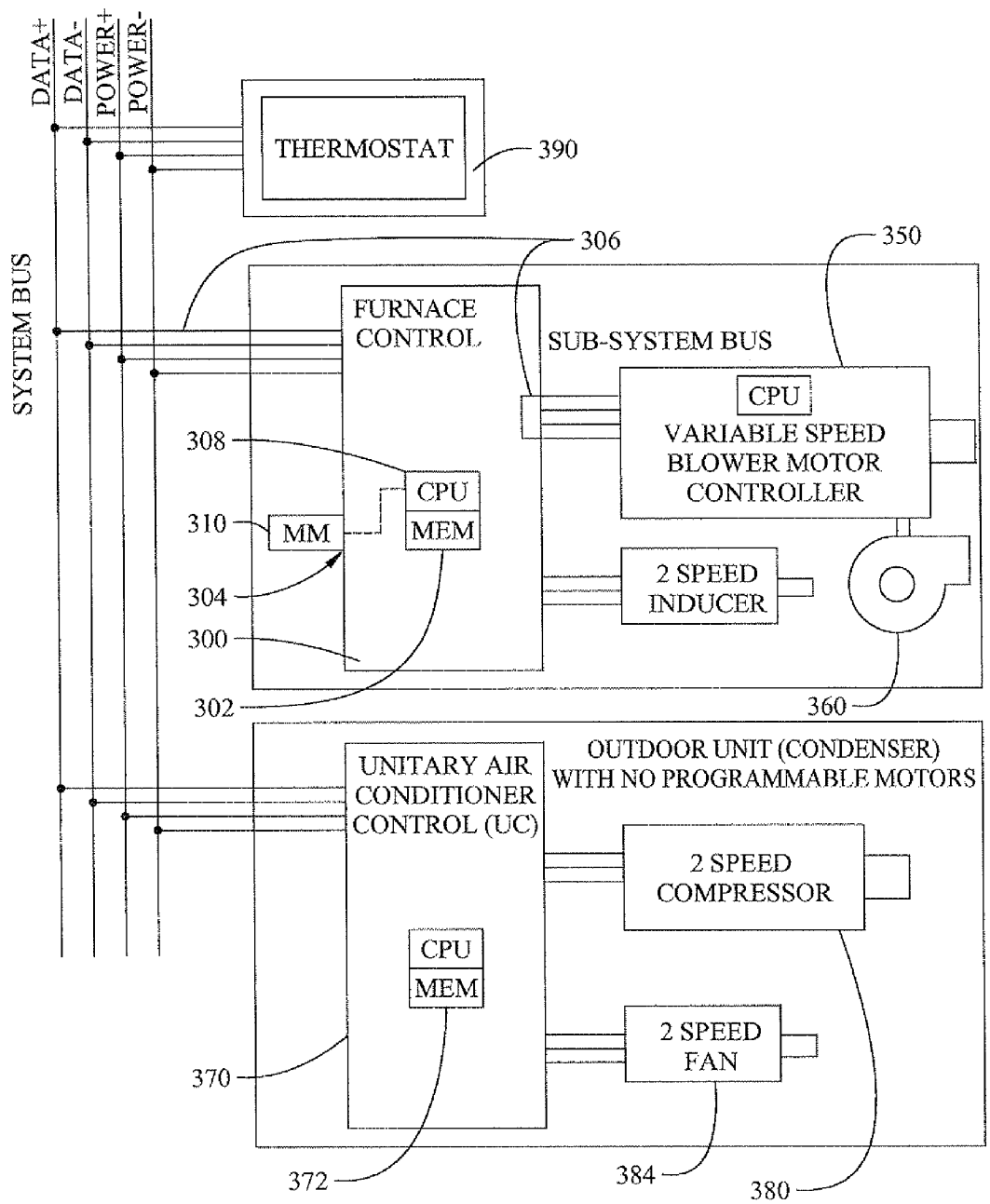
FIG. 3 is a schematic illustration of a heating system that includes a system controller according to the principles of the present disclosure.

Referring to FIG. 3, a second embodiment of a single configurable controller 300 is shown. The controller 300 includes a memory 302 associated with the controller 300 that is initially "blank", or absent any parameters specific to a particular system or blower motor. The controller 300 further includes a connector 304 for receiving a separate memory module 310 which is preferably connected to the controller 300 via a Universal Serial Bus (USB) interface connector, or other comparable connection means. The separate memory module 310 allows manufacturers of a particular heating and/or cooling system to store thereon information pertaining to the particular system, including parameters specific to a number of blower motors that may be installed for the particular system or blower. This permits manufacturers to configure the "blank" controller for a particular size and type of system.

The second embodiment of a controller 300 includes a communication means 306, such as a Universal Asynchronous Serial Port (UART) 306 that provides a predetermined baud rate serial bit stream signal, or a 4-wire connection, or other forms of connection for permitting communication. The communication means 306 preferably communicates a signal including information communicated via a data port of a processor 308 (or microprocessor) of the controller 300. Through the communication means 306, information is communicated between the controller 300 and a blower motor controller 350 associated with a particular installed blower motor 360. The memory module 310 permits the controller to download or retrieve stored information that includes parameters specific to a number of various blower motors that may be installed, including the particular blower motor installed in the particular system. The controller 300 preferably stores the retrieved information on an internal memory that is associated with the controller 300.

The second embodiment of a controller 300 further includes a processor 308 that, upon application of electrical power to the controller 300, is configured to retrieve the stored information from the memory module 310, which information includes parameters associated with a variety of blower motors 360 that may be installed for the particular system. This information may include various parameters associated with each type of particular motor that the manufacturer has selected or identified as a motor that may be installed for the particular size and type of system. The specific information is preferably stored on the memory module 310 by the manufacturer at the time of manufacture of the particular system.

The processor 308 is further configured to receive information from the blower motor controller 350, which information identifies the manufacturer identification and/or horsepower of the actual installed motor 360. From this identification information, the processor 308 is configured to retrieve from memory 302 motor related parameters that are specific to the identified blower motor 360, and to send the specific parameters to the blower motor controller 350. The controller 300 thereby is configured to provide the specific operating parameters corresponding to the particular system and the identified blower motor 360 to the blower motor controller 350, for subsequent use in controlling the operation of the blower motor 360.

Referring to FIG. 3, the controller may further be configured to communicate via the communication means to other controllers in the environmental control system, such as a Unitary Controller 370 for an Air Conditioning system. The controller 370 may provide control signals or information to a compressor 380 or fan motor 384 for the Air Conditioning system. Accordingly, the system controller 300 may further be configured to communicate to a Unitary Air Conditioning Unit controller 370 for controlling one or motors of an Air Conditioning system similar to the manner that is described above.

In a third embodiment of a system controller for a particular HVAC system having at least one other controller as in FIG. 3, the system controller is in communication with the at least one other controller via the communication means 306. Unlike the HVAC system shown in FIG. 1 in which a separate memory module 110 is necessitated to provide for back-up of system specific parameters stored in the memory 102 of the sole system controller 100, the HVAC system in FIG. 3 includes at least one other system controller 370 having an on-board memory 372. Accordingly, for the system controller 300 shown in FIG. 3, the system controller does not require a separate memory module for storing a back-up of parameters, but instead relies on the memory 372 in the Unitary Air Conditioning Unit controller 370.

For example, where the controller 300 is selected or designated for the particular heating and/or cooling system shown in FIG. 3, the manufacturer may input via an interface device 304 system specific information to configure the controller 300 for the particular heating or cooling system. The system controller 300 has a processor 308 that stores the specific values and parameters into its memory 302, such that the information and/or parameters relating to the particular blower motor that is installed can be retrieved for controlling operation of the identified blower motor. The processor 308 could then receive information from the blower motor controller 350 via the communication means 306, which identifies the manufacturer identification and/or horsepower of the installed blower motor 360. From this identifying information, the processor 308 would retrieve from memory 302 motor related parameters that are specific to the identified blower motor 360, and send the specific parameters to the blower motor controller 350. The processor 308 can communicate the specific parameters, configuration settings, variables or values to the blower motor controller 350 via the communication means 306. Once the system controller has saved the parameters specific to the particular system in the local memory 302 of the system controller 300, the system controller 300 is also configured to communicate the system specific parameter information (via communication means 306) to the Unitary Air Conditioning Unit controller 370, which would store the system parameter information in its on-board memory 372.

In the event that the controller 300 becomes damaged, defective, or requires replacement for any reason, a replacement "blank" configurable controller may be used to replace the originally installed controller. The system controller's onboard memory 302 is typically the dominant memory, unless the system controller is replaced with a "blank" replacement controller. If the system controller 300 is a "blank" replacement controller, the on-board memory 372 of the Unitary Air Conditioning Unit controller 370 becomes dominant. This may be established, for example, by the presence of a default code on a blank controller that signals the controller's processor that it is not dominant. Once the system controller 300 communicates a request, the system controller 300 stores in its local memory the parameters that were stored in the memory 372 of the Unitary Air Conditioning Unit controller 370. The replacement system controller 300 is configured to store this information on its onboard memory 302, such that the default code is over-written and the controller's processor no longer detects the code. At this point, the replacement system controller 300 would recognize the local memory 302 as being dominant once again. As such, the processor 308 of the replacement controller 300 is configured to establish the on-board memory 302 as the dominant memory. Where a "blank" replacement controller 300 is installed in place of the original dominant controller, the default code on the blank replacement controller would signal the replacement controller's processor that it is not dominant, and the processor would retrieve information from the on-board memory 372 of the Unitary Air Conditioning Unit controller 370. This back-up of parameter information would be stored in the on-board memory 302 of the replacement system controller 300. Accordingly, a single "blank" configurable controller is provided that permits manufacturers of heating and/or cooling systems to configure the "blank" controller for a particular size and type of system, while also permitting the replacement of the installed configured controller with a "blank" replacement controller.

In the above embodiments, the system controller further includes a synchronizing aspect with regard to the two memory locations. For example, the on-board memory 102 of controller 100 and the separate memory module 110 have a particular synchronization priority, which is a function of which memory is dominant. The system controller's onboard memory 102 is always the dominant memory, unless the system controller is replaced with a "blank" replacement controller, in which case the memory module 110 becomes dominant until it has updated the onboard memory of the replacement controller, at which point the system memory 102 becomes dominant once again. This may be established, for example, by the presence of a default code on a blank controller that signals the controller's processor that it is not dominant. Once the controller is programmed or configured by a manufacturer for a particular HVAC system, the default code is over-written and the controller's processor no longer detects the code. As such, the processor establishes the on-board memory 102 as the dominant memory. If a "blank" replacement controller 100 were installed in place of the dominant controller, the default code on the blank replacement controller would signal the controller's processor that it is not dominant, and the processor would retrieve information from the separate memory module and store the information on the on-board memory 102.

Figure 4:
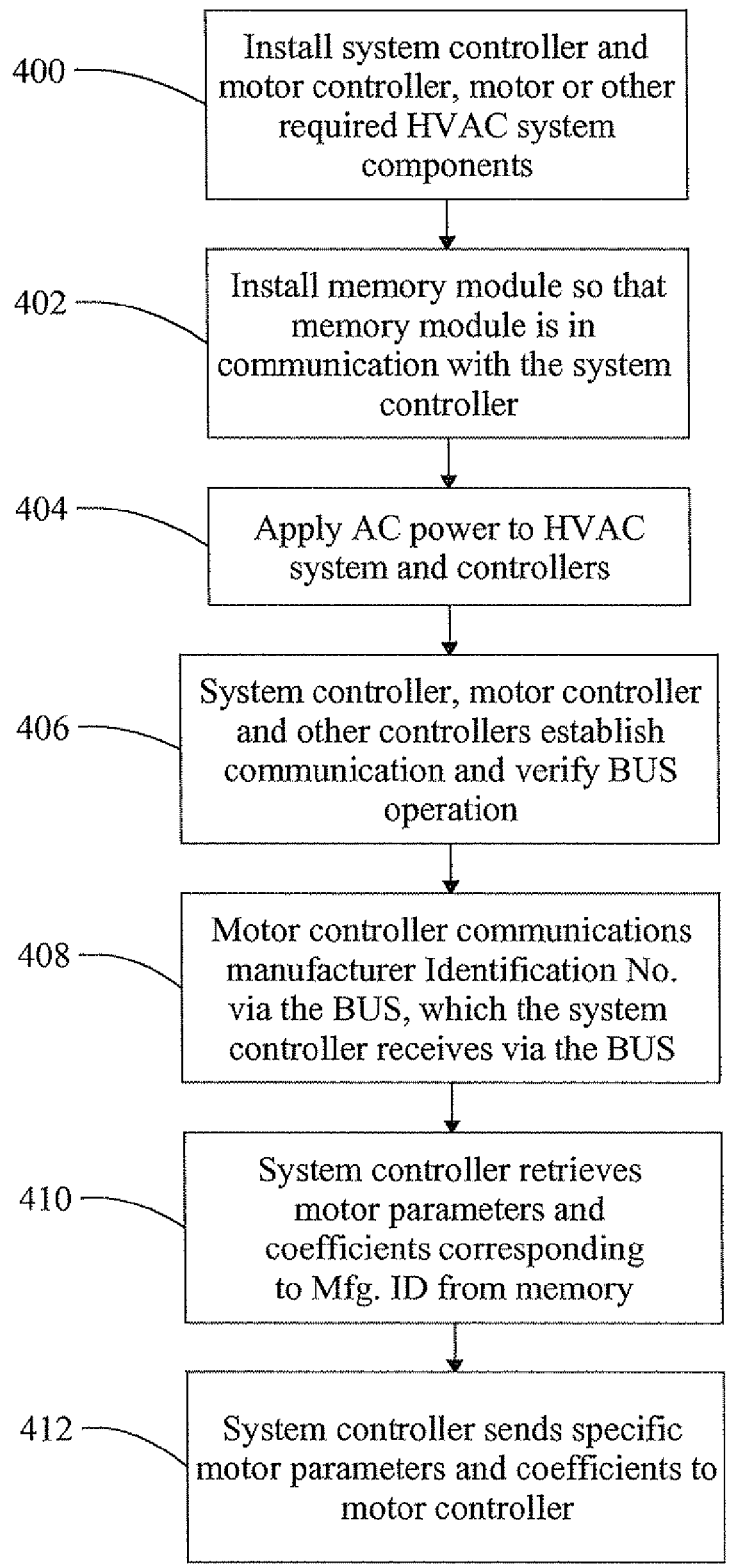
FIG. 4 is a flow chart describing one embodiment of a method for configuring and controlling the operation of a system controller for a heating or cooling system.

According to another aspect of the present application, various embodiments of a method for controlling the operation of a system controller for a heating or cooling system are provided. Referring to FIG. 4, one embodiment of a method for controlling a system that includes a system controller and a blower motor controller is disclosed. The method comprises the step 404 of applying electrical power to the heating or cooling system, the system controller and the blower motor controller, and establishing communication via a bus network between the system controller and the blower motor controller at step 406. The method further comprises the step 408 of receiving from the blower motor controller information identifying the particular blower motor controller via the bus network, and retrieving from memory the specific motor related parameters corresponding to the identified blower motor controller at step 410. The system controller then sends the specific motor related parameters corresponding to the identified blower motor controller to the blower motor controller at step 412, thereby provide the operating parameters specific to the identified blower motor controller, which are then utilized in controlling the operation of the blower motor.

In another aspect of the present application, the controllers may also be configured to store component controller information in the memories of other controllers in the HVAC system. For example, the separate memory module 110 used with the system controller 100 may also include system parameters for an inducer motor controller or an air conditioning motor controller. If either of these other types of controllers become damaged, the replacement controllers for these components could detect the presence of a communication network, and request the system controller 100 to communicate the parameters for the particular unit to the particular device, such as the inducer motor controller or air conditioning fan motor controller.

In another aspect of the present application, the above embodiments may further include an alternate configuration as well. In the above embodiments, the system controller may further be configured to receive communication of information relating to other operating parameters of the heating or cooling system. For example, the processor 308 may be coupled to an input means or the communication means 306, and may be configured to determine an appropriate system configuration for a given combination of input signals received at the input connector 306 from the memory device 304. Although the embodiment of FIG. 3 may employ an input means and/or a wired communication means 306, it should be understood that one or more wireless inputs and/or wireless outputs (i.e., without connectors) can be used in a given application of the present disclosure. Shown in FIG. 3 are the heating and cooling system controller 300, a blower motor controller 350 (for controlling an electric motor 360 and a blower), and a thermostat 390. The controller 300 may further comprise an interface connector (not shown) that includes sixteen input pins for receiving input signals to the system controller 300 via a sixteen wire communication cable (not shown). The types of signals provided at the pins of the input connector 306 in this particular HVAC system are indicated in Table 2, below.

TABLE 2

| Pin | Description |
|---|---|
| 1 | C1 |
| 2 | W/W1 |
| 3 | C2 |
| 4 | DELAY |
| 5 | COOL |
| 6 | Y1 |
| 7 | ADJUST |
| 8 | Out− |
| 9 | O |
| 10 | BK/PWM |
| 11 | HEAT |
| 12 | R |
| 13 | EM/W2 |
| 14 | Y/Y2 |
| 15 | G |
| 16 | Out+ |

The C1 and C2 pins are used for ground connections; the W/W1 signal represents a call for low heat signal; the DELAY signal represents the amount of time the blower motor assembly should delay start-up when heating/cooling operation is commenced, or delay shut-down after heating/operation is concluded; the COOL signal represents one or more cooling operation configurations; the Y1 signal represents a call for low cooling signal; the ADJUST signal represents a trim control signal for adjusting circulator speed, based on conditions such as humidity, etc.; the Out− signal (together with the Out+ signal) represent a signal for flashing or pulsing an LED in a manner that is indicative of the motor's speed; the O signal represents the presence of a refrigerant reversing valve in a heat pump system that would affect the circulator blower speed; the BK/PWM signal represents a signal indicating the presence of a humidifier, for fractionally adjusting the speed based on humidifier operation; the HEAT signal represents one or more heating operation configurations; the R signal represents the presence of a low-voltage HVAC transformer; the EM/W2 signal represents a call for high heating signal; the Y/Y2 signal represents a call for high cooling signal; the G signal represents a signal for requesting circulator blower operation, and the Out+ signal (together with the Out− signal) represent a signal for flashing or pulsing an LED in a manner that is indicative of the motor's speed.

In this particular embodiment, each of the following input signals correspond to one or more variables in the airflow equation: HEAT, COOL, ADJUST, W/W1, Y1, O, BK, R, EM/W2, Y/Y2 and G. Of these, the following input signals are configuration signals relating to configuration settings made during installation or startup of the HVAC system 400: HEAT, COOL, DELAY and ADJUST. The following other signals are operating input signals that change during normal operation of the HVAC system: W/W1, Y1, O, BK, R, EM/W2, Y/Y2 and G. The following operating input signals are generated by the thermostat 390 and provided to the interface device 304 via the system controller 300 typically as alternating or pulse width modulated (PWM) signals: BK/PWM. The system controller 300 may be configured to use lookup tables, for example, for selecting and retrieving specific parameters from the controller's memory 302 in response to user input signals from the thermostat 390, to thereby provide the necessary information to the blower motor controller or other components to control the operation of the particular system in response to the thermostat 390.

In the embodiment of FIG. 3, the DELAY signal does not correspond to any particular variable in the airflow equation. Instead, the DELAY signal indicates the amount of time that the blower motor assembly should delay start-up after a call for heating/cooling has been called for, or continue to operate after a call for heat or cooling has ended. This delay time is communicated to the blower motor controller 350 together with the coefficients and parameters from Table 1 above, to thereby control the operation of the blower motor. Accordingly, the system controller 300 may further control other operational aspects of the blower and other components, which may be specific to the particular heating or cooling system.

It will be understood by those skilled in the art that the above system controller may be employed with either a cooling or heating system without implementing the other, particularly if the thermostat is used or designed to control only a cooling or a heating system. It will be understood that the system controller described above may be utilized in forms of heating and cooling systems, including multistage or variable speed heating and cooling systems. Accordingly, it should be understood that the disclosed embodiments, and variations thereof, may be employed in any type of heating system.

What is claimed is:

1. A system for controlling the operation of a heating and/or cooling system, comprising:
 a system controller of a heating and/or cooling system; and
 a component controller for controlling a blower motor, the component controller being configured to transmit, to the system controller after the component controller has been installed but before the component controller has been configured for operation in the heating and/or cooling system, information specifying at least a motor type of the blower motor that is installed and is to be controlled by the component controller in the heating and/or cooling system;
 the system controller having a local memory in which system parameter information relating to the heating and/or cooling system is stored, said system parameter information including motor related parameters for various types of blower motors, the system controller being configured to send, to the component controller before the component controller has been configured for operation in the heating and/or cooling system, and based on the motor type transmitted by the component controller, at least some of the motor related parameters for the blower motor to thereby provide at least some motor related parameters for use in controlling operation of the blower motor in the heating and/or cooling system.

2. The system of claim 1 wherein the system controller is configured to request the operation of the blower motor through the communication of one or more command signals to the component controller for controlling the blower motor, where each command signal includes parameter information specific to the component controller and the blower motor.

3. The system of claim 1 wherein the system controller requests the operation of the blower motor at a particular airflow in terms of cubic feet per minute (CFM), by communicating command signals to the component controller for controlling the blower motor, where the command signals include the requested CFM and parameter information specific to the component controller and blower motor.

4. The system of claim 1 wherein said system parameter information includes one or more of the following: a manufacturer identification number associated with the type of blower motor, and the horsepower rating of the installed blower motor.

5. The system of claim 1 wherein upon replacement of the component controller for the blower motor with a replacement component controller, the replacement component controller is configured to receive configuration data from the system controller.

6. The system of claim 1 wherein the component controller includes a memory device on which system parameter information is stored, the system further configured to retrieve the system parameter information from the component controller to configure a replacement system controller if the installed system controller requires replacement.

7. The system of claim 1, wherein the system controller is configured to provide configuration data to a replacement component controller in response to user input signals.

8. The system of claim 7, wherein the system includes a thermostat having an input interface that allows a user to input information including the user input signals.

9. A system for controlling the operation of a heating and/or cooling system, comprising:
a system controller of a heating and/or cooling system; and
a component controller for controlling a blower motor, the component controller being configured to transmit, to the system controller over a communication device after the component controller has been installed but before the component controller has been configured for operation in the heating and/or cooling system, data signals that include information specifying at least a motor type of the blower motor that is installed and that the component controller is to control when configured in the heating or cooling system;
the system controller configured to receive, after configuration of the component controller for operation in the heating and/or cooling system, configuration data including motor related parameters from the component controller for the blower motor and to store the motor related parameters corresponding to the blower motor;
whereby a replacement controller is configured to receive the stored motor related parameters from the system controller after installation of the replacement controller to replace the component controller.

10. The system of claim 9 wherein the system controller selects the at least some of the motor related parameters to send to the component controller based on the motor type of the blower motor transmitted by the component controller.

11. The system of claim 9 wherein the system controller is configured to request the operation of the blower motor through the communication of one or more command signals to the component controller for controlling the blower motor, where each command signal includes parameter information specific to the component controller and blower motor.

12. The system of claim 9 wherein the system controller requests the operation of the blower motor at a particular airflow in terms of cubic feet per minute (CFM), by communicating command signals to the component controller for controlling the blower motor, where the command signals include the requested CFM and parameter information specific to the component controller and blower motor.

13. The system of claim 9 wherein the motor related parameters include one or more of the following: a manufacturer identification number associated with the type of blower motor, and the horsepower rating of the installed blower motor.

14. The system of claim 9 wherein the component controller includes a memory device on which system parameter information is stored, the system further configured to retrieve the system parameter information from the component controller to configure a replacement system controller if the installed system controller requires replacement.

15. The system of claim 9, wherein the system controller is configured to provide stored configuration data to a replacement component controller in response to user input signals.

16. The system of claim 15, wherein the system includes a thermostat having an input interface that allows a user to input information including the user input signals.

17. A system for controlling the operation of a heating and/or cooling system, comprising:
a system controller of a heating and/or cooling system;
a memory associated with the system controller in which system parameter information relating to the heating and/or cooling system is stored, said system parameter information including a plurality of operational parameters corresponding to a plurality of heating and/or cooling system component types, where a given system component of a given one of the types may be selected and installed in the system from among other components of the given type and for which at least some of the operating parameters are provided; and
a communication device through which the system controller is configured to transmit signals to and/or to receive signals from at least one component controller for controlling at least one system component of the heating and/or cooling system;
wherein the system controller is configured to receive from the at least one component controller over the communication device a data signal that includes information relating to operational parameters for the at least one system component that is installed in the system, said system controller being configured to store in the memory the received operational parameters corresponding to the at least one system component;
the received operational parameters stored by the system controller being retrievable for communication to a replacement component controller in the event that the at least one component controller is replaced.

18. The system of claim 17 wherein the at least one component controller comprises a controller for a blower motor, and the types of heating and/or cooling system components comprise a plurality of types of blower motors, and the operational parameters comprise at least one motor related parameter corresponding to at least one type of blower motor.

19. The system of claim 18 wherein the system controller is configured to request the operation of the blower motor through the communication of one or more command signals to the controller for the blower motor, where each command signal includes parameter information specific to the blower motor controller and blower motor.

20. The system of claim 18 wherein the system controller requests the operation of the blower motor at a particular airflow in terms of cubic feet per minute (CFM), by communicating command signals to the blower motor controller for controlling the blower motor, where the command signals include the requested CFM and parameter information specific to the blower motor controller and blower motor.

21. The system of claim 17 wherein the at least one component controller comprises an air conditioning system controller that controls-a compressor and fan motor, and the types of heating and/or cooling system components comprise a plurality of component sizes, and operational parameters include at least one parameter corresponding to tonnage of the compressor.

22. The system of claim 17 wherein the at least one component controller includes a memory device on which parameter information of at least one other component controller is stored, the system further configured to retrieve the parameter information from the at least one component controller to configure a replacement for the at least one other component controller if the at least one other component controller requires replacement.

23. The system of claim 17 wherein the at least one component controller includes a memory device on which system parameter information is stored, the system further configured to retrieve the system parameter information from the at least one component controller for communication to a replacement system controller.

24. The system of claim 17 wherein the memory associated with the system controller comprises a removable memory device removable from the system controller to retain the system parameter information stored on the removable memory device for use if the system controller requires replacement.

25. The system of claim 17 wherein the communication device comprises a Universal Asynchronous Serial Port that provides a predetermined baud rate serial bit stream signal, a 4-wire BUS connection, or wireless communication means.

26. The system of claim 17 wherein the memory associated with the system controller is local to the system controller, and wherein the system further comprises a memory module connected to the system controller, wherein the system parameter information stored in the local memory of the system controller is also stored in the memory module.

27. The system of claim 26 wherein the system controller is configured to detect the installation of a memory module in which stored system parameters are absent and to copy the system parameter information stored in the local memory of the system controller to the memory module connected to the system controller.

28. The system of claim 26 wherein the system controller is configured to synchronize the local memory with the memory module.

29. The system of claim 26 wherein the memory module is connected to the system controller via a Universal Serial Bus (USB) interface.

30. The system of claim 26 wherein the memory module is removable from the system controller and reconnectable to a blank replacement controller having a local memory, whereby the replacement controller when connected to the memory module synchronizes its local memory to the memory module by copying the system parameter information from the memory module to the local memory of the replacement controller.

31. The system of claim 26 wherein the system is configured with a synchronizing priority for determining which of the local memory and the memory module is dominant, whereby the local memory is dominant unless the absence of any stored system parameter information in the local memory is detected whereupon the memory module is dominant until the system parameter information from the memory module is stored to the local memory which then becomes dominant.

32. The system of claim 31 wherein the synchronizing priority is established by the presence of a default code on a replacement controller that indicates that a local memory of the replacement controller is not dominant, which default code is overwritten and no longer detectable when the system parameter information is stored to the local memory of the replacement controller.

33. The system of claim 26 further comprising an input interface configured to permit system parameter information relating to the heating or cooling system to be input, whereby the system parameter information input via the input interface is stored in the memory module and the local memory of the system controller.

34. The system of claim 17, wherein the system controller and the at least one component controller comprise at least one or more of a controller for a blower motor, a controller for an air conditioning system, and a thermostat.

35. The system of claim 17, wherein the system controller is configured to provide the received operational parameters stored by the system controller to the replacement component controller in response to user input signals.

36. The system of claim 35, wherein the system includes a thermostat having an input interface that allows a user to input information including the user input signals.

* * * * *